Oct. 1, 1963     L. C. CARISSIMI     3,105,298
ELECTRIC SHAVER CUTTER DRIVE MECHANISM
Filed Jan. 11, 1960
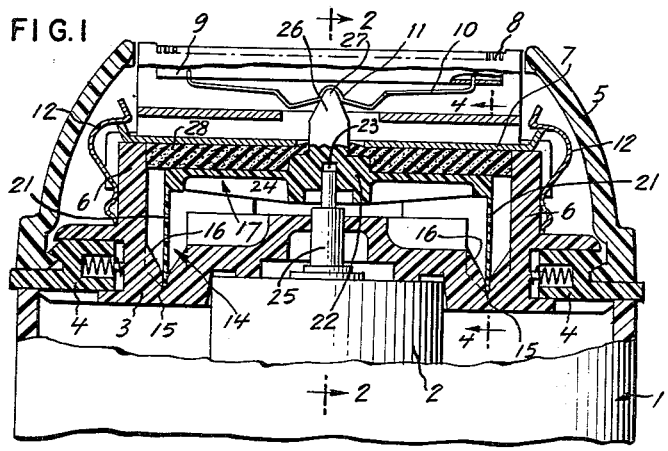
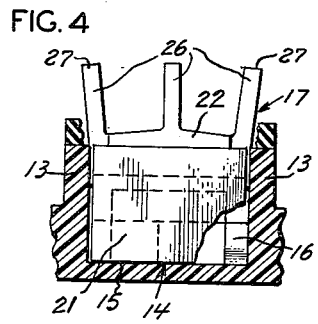
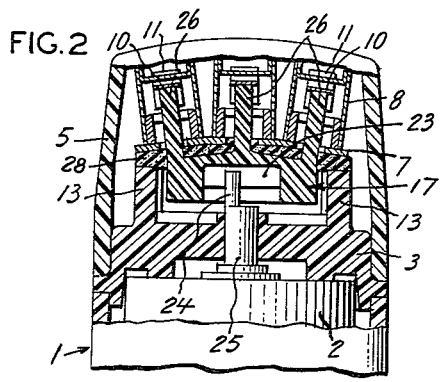
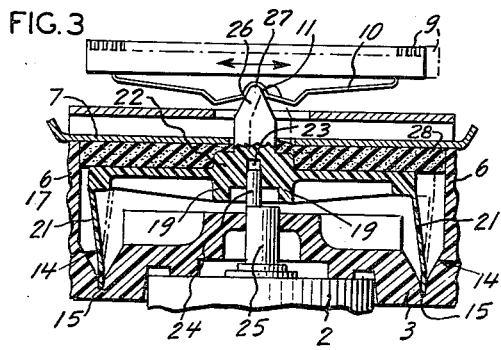
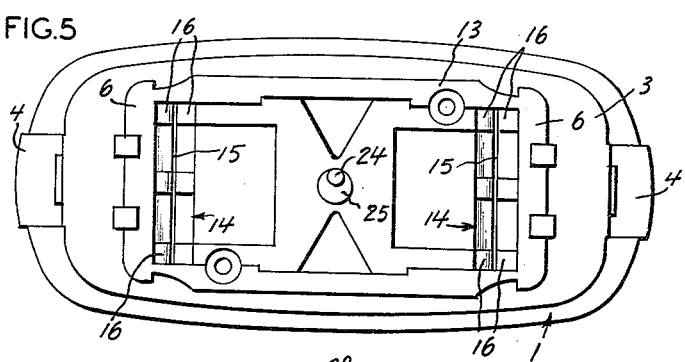
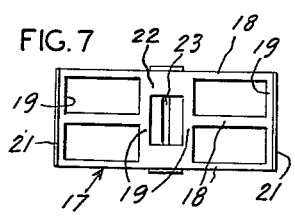
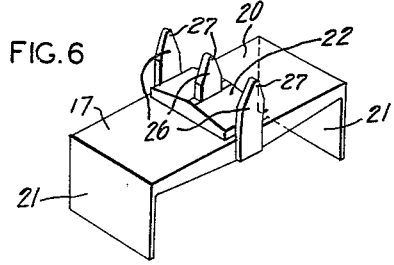
INVENTOR.
LOUIS C. CARISSIMI
BY
*Roland T. Booth*
ATTORNEY United States Patent Office 3,105,298
Patented Oct. 1, 1963

3,105,298
ELECTRIC SHAVER CUTTER DRIVE MECHANISM
Louis C. Carissimi, Fairfield, Conn., assignor to Sperry Rand Corporation, New York, N.Y., a corporation of Delaware
Filed Jan. 11, 1960, Ser. No. 1,547
8 Claims. (Cl. 30—43)

This invention relates to a cutter drive mechanism for electric shavers.

According to the invention, an electric shaver embodying the invention has a wall portion of the shaver casing formed to detachably mount the cutter mechanism in outwardly projecting relation for use in shaving, the cutter mechanism having an outer stationary cutter and an inner movable cutter. The inner movable cutter is engaged by an operating arm carried by a cutter drive member. The cutter drive member has a body portion extending in substantially parallel relation to the casing portion supporting said cutter mechanism and is provided on opposite ends with flexible supporting legs engaged in horizontal supports provided in a supporting portion of the casing. The cutter drive supports extend in an opposite direction from the operating arm engaged with a movable cutter and resilient means cooperates with the movable cutter and drive member to retain the parts in operative relation. An electric motor mounted in the shaver casing operates a suitable drive member projecting through the wall portion of the casing to engage and reciprocate the cutter drive member in the operation of the motor.

The invention provides a cutter drive mechanism for electric shavers in which a longitudinally extending bar or strip portion is provided on opposite ends with laterally extending flexible supporting legs engaged in drive supports carried by the shaver casing while an intermediate portion of the bar or strip portion has cutter engaging means thereon which extends in an opposite direction to engage the inner movable cutter of the cutting mechanism detachably mounted on the shaver casing over the bar or strip portion. The cutter drive member provided by the invention is adapted to provide straight linear movement of an inner reciprocating cutter for maintaining the ends of the movable cutter in full cutting engagement with the stationary cutter throughout all portions of its reciprocating movement.

The invention provides a drive mechanism for electric shavers adapted to more efficiently drive the cutter mechanism so that likelihood of disengagement of portions of the movable cutter from the stationary cutter during high speed movement are substantially eliminated. The invention provides means for producing this result in the form of a cutter drive member having a longitudinally extending bar portion supported at opposite ends on the shaver casing for reciprocating movement in a substantially straight line or plane parallel with the plane of movement of the movable cutter means of the cutting mechanism mounted on the shaver casing. The cutter drive member has an arm extending laterally from the bar portion to engage a portion of the movable cutter assembly while resilient means may be retained under compression between the movable cutter and cutter drive member to retain the movable cutter in operating engagement with the stationary cutter means carried by the shaver throughout high speed reciprocation of the cutter drive member and inner cutter by a suitable motor carried by the shaver casing.

The invention provides a shaver in which the casing has a wall portion provided with cutter supports arranged in spaced parallel relation to receive the ends of the cutter mechanism on the free ends of the cutter supports and means for detachably retaining the cutter mechanism on the cutter supports. Opposite ends of the cutter supports are connected by closure walls extending longitudinally on the wall portion. The closure walls and cutter supports project outwardly from the wall portion to form a compartment. The wall portion at opposite ends of the compartment is formed with horizontal supports to receive flexible legs extending laterally from opposite ends of a plate or strip member having the outer surface supported by the legs in substantially co-planar relation with the outer edges of the closure walls. The cutter drive member is shorter than the distance between the cutter supports so that it is adapted for reciprocating movement within the compartment between the cutter supports. An intermediate portion of the strip or plate member forming the cutter drive member has outwardly extending drive means or arms formed to engage the movable part of the cutter mechanism for producing back and forth linear movement of the movable part during reciprocating movement of the cutter drive member. A sealing member is engaged on the outer face of the plate portion of the cutter drive member and extends between the cutter supports with the side edges extending outwardly over the outer edges of the closure walls where these side edges are retained in position by the side edges of the cutter mechanism mounted on the cutter supports. This provides a seal for eliminating the entrance of hair particles into the compartment in which the cutter drive member is mounted. The driving arms or means on the cutter drive member extend through this seal member to engage the movable cutter mechanism. The plate portion of the cutter drive member has the side edges terminating adjacent the inner faces of the closure walls. The ends of the flexible legs on the cutter drive member are straight to engage flat seats on the wall portion of the shaver casing for cooperation in supporting and insuring linear movement of the plate portion of the cutter drive member when reciprocated by an electric motor mechanism contained in the shaver casing.

The cutter drive member may preferably be formed of suitable plastic, such as nylon. It may be molded in one piece with longitudinal and transversely extending frame bars joined at their ends to provide a rigid frame structure. The edges of the bars on one side of the frame are integral with a flat plate portion extending throughout the area of the frame to provide a rigid rectangular cutter drive strip or plate portion having integral flexible legs extending laterally in one direction away from said plate portion and power driving arms extending from an intermediate portion of the plate portion in an opposite direction from the legs.

In the drawing:

FIG. 1 is a vertical transverse cross-section through the portion of the shaver having a wall portion formed to support a cutter drive member and cutting mechanism illustrating details of construction of the invention.

FIG. 2 is a vertical transverse cross-section taken on line 2—2 of FIG. 1.

FIG. 3 is a diagrammatic view similar to FIG. 1 illustrating the cutter drive member and movable cutter in full lines at one end of its path of movement and in dotted lines at the opposite end of its path of movement during operation by the shaver motor.

FIG. 4 is a vertical transverse cross-section taken on line 4—4 of FIG. 1.

FIG. 5 is a plan view showing the construction of a wall portion of the shaver to provide the housing for the cutter drive member with the cutter drive supports and cutter supports, to illustrate details of construction of the shaver casing.

FIG. 6 shows a cutter drive member in perspective looking downwardly toward the member from beyond one end and one side.

FIG. 7 is a bottom plan view of a cutter drive member.

A shaver casing 1 is formed of two or more sections to provide a motor compartment housing an electric motor 2 which may be of any conventional form now used for driving the cutter mechanism of an electric shaver. Shaver casing 1 has a wall portion 3 forming one side thereof. Wall portion 3 is preferably of rectangular form to extend between other sides of the casing and is formed of sufficient length to support the cutter mechanism and associated parts. Wall portion 3 has opposite ends formed to slidably mount latches 4 for detachably mounting casing section 5 forming a hair pocket in outwardly extending relation from wall portion 3, as shown in FIGS. 1 and 2. Within the area defined by casing section or hair pocket 5, wall portion 3 is formed with a pair of spaced parallel outwardly extending cutter supports 6. These cutter supports extend transversely of wall portion 3, as clearly shown in FIG. 6, and have flat outer end surfaces on which the end portions of supporting plate 7 carrying cutter heads 8 of conventional form are engaged, as shown in FIG. 1. Supporting plates 7 and cutter heads 8 are constructed in the manner disclosed in U.S. Patent No. 2,793,430, patented May 28, 1957.

The cutter heads include an outer stationary cutter secured to supporting plate 7 and an inner movable cutter indicated at 9. A leaf spring 10 has opposite ends engaged with opposite ends of inner cutter 9 and the central portion is formed with centering and driving portions indicated at 11. The shaver head assembly mounted on plate 7, as shown in the above-mentioned patent, is retained on cutter support 6 by a pair of clips 12. Spring clips 12 are attached to cutter supports 6 by having opposite ends formed with latch extensions engaging about the side edges of cutter supports 6 as shown in FIG. 5. The upwardly extending arms on spring clips 12 extend over the ends of plate 7 as shown in FIG. 1 and detachably secure the cutter assembly with the cutter heads on cutter supports 6. Closure walls 13 formed on wall portion 3 extend outwardly in parallel relation to connect opposite sides of cutter supports 6 as shown in FIGS. 2 and 5. These walls cooperate with cutter supports 6 to form a rectangular housing on the outer face of wall portion 3 below cutter supporting plate 7 in which the outer edges of closure walls 13 terminate in spaced relation as shown in FIG. 2, below the side edges of cutter supporting plates 7 for a purpose that will be hereinafter described.

Wall portion 3 has spaced portions along the inside wall of cutter support 6 formed to provide cutter drive supports 14. Cutter drive supports 14 are formed by recesses extending inwardly from the outer face of wall portion 3 in transversely extending relation, as clearly shown in FIG. 5. Wall portion 3 is formed at the bottom of these recesses with a flat transverse wall portion 15 which extends transversely between the inner faces of closure walls 13 at the bottom of the recess and are substantially narrow in width, as clearly indicated by the illustration in FIGS. 1, 3 and 5. The recess forming cutter supports 14 and wall portion 3 are inclined outwardly from flat transverse wall portion 15, as clearly shown in FIGS. 1 and 3. Outwardly extending guide ribs 16 are formed in pairs in the center portion and at opposite ends in each of the recesses forming cutter drive supports 14 so as to project inwardly from the outwardly flared wall for a purpose that will be hereinafter described.

A feature of the present invention is the cutter drive member 17 which has a body portion formed by a plurality of longitudinal bars 18 and transverse bars 19 secured together at their ends to one another to form a rigid rectangular frame. The outer sides of these bars are attached to a flat strip or plate portion 20. At opposite ends, cutter drive member 17 has supporting legs 21 of fixed length formed thereon, as shown in the several figures particularly FIGS. 6 and 7. Legs 21 extend laterally in substantially perpendicular relation from end bars 19 of the body member or plate portion 20 and have the extremities formed with straight flat edges arranged in spaced parallel relation to plate portion 20. The extremities or edges of supporting legs 21 are engaged with flat transverse wall portions 15 of cutter drive supports 14 and contact these wall portions 15 throughout substantially the entire transverse length and width thereof. Legs 21 are thin inextensible flexible members that will bend relative to plate portion 20 or the body of the cutter drive member, but which will rigidly support the cutter drive member on wall portion 3 in the chamber formed by closure walls 13 and cutter supports 6, as shown in FIGS. 1 to 4. This cutter drive member may be formed of any suitable material, it having been found that nylon provides a suitable form of plastic material from which the cutter drive member may be molded in one piece.

The outer face of plate portion 20 of cutter drive member 17 is supported in substantially coplanar relation with the outer edges of closure walls 13, as shown in FIG. 4. The frame member for body portion of cutter drive member 17 has a length that is substantially equal to the distance between flat transverse wall portions 15 of cutter drive supports 14 so that a space is left between opposite ends of the cutter drive member and the inner faces of cutter supports 6 as shown in FIG. 1, when the cutter drive member is in its normal position of rest. The central portion of cutter drive member 17 is formed with a transversely extending portion of enlarged cross-section indicated at 22 integral with a pair of spaced transverse bars 19, as shown in FIGS. 3 and 7. A transverse slot 23 is formed in portion 22 to provide transversely extending walls for engaging with the surface of an eccentric pin 24 on the end of motor drive shaft 25 carried by electric motor 2. Drive shaft 25 projects through an aperture in wall portion 3 from motor 2 for positioning eccentric pin 24 to engage in transverse slot 23 so that in the rotation of shaft 25, eccentric pin 24 will engage the walls of cutter drive member 17 within the transverse slot and reciprocate the frame and plate portion forming the body member of cutter drive member 17 longitudinally back and forth on legs 21.

The outer face of transverse portion 22 of the body portion of cutter drive member 17 is formed with an outwardly extending drive arm 26, said drive arm also referred to as a cutter actuating member, for each inner movable cutter located in a transverse position on the cutter drive member to extend laterally outward from the frame or body portion in a direction opposite to supporting legs 21 so that the outer free end will operate the inner movable cutter 9 in each of the cutter heads 8. For this purpose, the outer end of each outwardly extending drive arm 26 is formed with a rounded terminal portion 27 for engaging in the driving portion of leaf spring 10, as shown in FIGS. 1 and 3. Drive arms 26 having length sufficient to place leaf springs 10 under sufficient tension so that inner movable cutters 9, as well as cutter drive member 17, are spring pressed into operative position for normal operation of the shaver.

When the shaver motor is operated, eccentric pin 24 drives cutter drive member 17 in a linear direction back and forth through flexing supporting legs 21 throughout their length between the free ends and the body member of the cutter drive member, as shown in FIG. 3. FIG. 3 shows the cutter drive member with legs 21 flexed to the left in full lines at one limit of movement of the reciprocating movement of the cutter drive member, while the position of legs 21 in the cutter drive member are shown in dotted lines at the opposite limit of reciprocating movement of the body portion of the cutter drive member. Legs 21 prevent the ends of the body portion of the cutter drive member from moving downwardly toward wall portion 3 so as to obtain a substantially linear reciprocating movement of the body portion of the cutter drive member and drive arms 26. In this way, the linear reciprocating movement of the cutter drive member causes arms 26 to reciprocate inner movable cutters 9 in the shaver heads back and forth in such a way that any tendency to cause arcuate movement of inner cutters 9 as heretofore experienced in operating inner movable cutters of shaver heads is eliminated. Leaf spring 10 cooperates with the cutter drive member in obtaining linear movement of inner cutter 9 so that the cutter teeth thereon throughout the length of each inner cutter are maintained in full cutting contact with the cutting teeth on the stationary outer cutter. In this way the cutting efficiency of the shaver is increased. In the reciprocating operation of cutter drive member 17, guide ribs 16 cooperate with legs 21 to aid flexing of the legs intermediate the ends thereof by cooperating with the lower ends of legs 21 to cause flexing inwardly from the ends of the legs engaged with flat transverse wall portions 15.

With the outer surface of plate portion 20 of the cutter drive member lying substantially in the same horizontal plane as the outer edges of closure walls 13, a sealing strip 28 formed of sponge rubber or other suitable material may be engaged on the outer surface of the plate portion of the cutter drive member which extends between the inner faces of closure walls 13. The sealing strip is supported by the cutter drive member and has the outer edges extending over the edges or margins of closure walls 13 while opposite ends of said sealing strip 28 are engaged with the inner edges of cutter supports 6, as clearly shown in FIGS. 1 and 3. Sealing strip 28 has a thickness sufficient to fill the gap between the outer side edges of supporting plate 7 for the cutter heads and the outer edges of closure walls 13. This effectively seals the compartment or chamber formed by cutter supports 6 and closure walls 13 to prevent the entrance of hair cuttings into the compartment. The central portion of sealing strip 28 is formed with apertures to fit over outwardly extending drive arms 26, as shown in FIGS. 1 to 3.

Wall portion 3 of the casing is preferably molded to form the cutter supports 6, closure walls 13 and cutter drive supports 14 together with the guide portions for latches 4.

The cutter drive member may be conveniently positioned in the compartment formed by cutter supports 6 and closure walls 13 on wall portion 3 when casing section 5 and cutter heads 8 are in detached relation from wall portion 3. The drive member is positioned in operative position with the ends of the legs engaged with transverse wall portions 15. The sealing strip may then be placed over drive arms 26 to close the outer end of the compartment formed by the closure walls and cutter supports. Then, the cutter assembly with cutter heads 8 may be positioned on the outer ends of the cutter supports and the ends of supporting plate 7 locked into position by spring clips 12. In applying the cutter assembly to the cutter supports, drive arms 26 are engaged through apertures in plate 7 into the driving portions 11 of leaf springs 10 for compressing leaf springs 10 and retaining them in operative position for reciprocating the inner cutters. After the cutter heads are assembled on cutter supports 6, casing section 5 may be assembled into position about the cutter heads and the drive supports and secured by latches 4, as illustrated in FIGS. 1 and 2. In this way the entire cutter mechanism is enclosed by casing section 5 and the shaver is ready for use.

The cutter drive member provided by this invention eliminates pivots and reduces other types of drive connections between a shaver motor and movable cutter to a minimum for eliminating clearances and lost motion between parts as well as reducing noise in operation.

The invention claimed is:

1. A shaver comprising a casing having a wall portion, a pair of spaced substantially parallel cutter supports extending outwardly from said wall portion, cutting means having opposite ends supported on the ends of said supports, said cutting means being spaced from said wall portion between said supports, means for detachably retaining said cutting means on said supports, spaced cutter drive supports formed on said wall portion between said cutter supports, a cutter drive member having a main body portion disposed substantially parallel to the cutting means and having laterally extending flexible legs on opposite ends of the main body portion with the free ends of said flexible legs engaged with said cutter drive supports for mounting said cutter drive member between said cutter supports in parallel relation to said wall portion, a cutter actuating arm on the main body portion having a free end interengaged with said cutting means for operating said cutting means during movement of said cutter drive member, and drive means in said casing having an operating member extending through said wall for engaging and operating said cutter drive member to produce cutting operation of said cutting means.

2. A shaver as claimed in claim 1, wherein said spaced cutter drive supports on said wall portion each have a flat transverse wall engaged by the extremity of one of said legs, and outwardly extending guide ribs cooperating with the free ends of said legs to support the said main body portion of said cutter drive member for longitudinal endwise movement in operating said cutting means.

3. A shaver as claimed in claim 2, wherein said cutter drive member is formed of a flat rectangular strip having flexible legs at opposite extremities extending laterally in the same direction having substantially the same width as the strip and having extremities with straight edges parallel to the strip for engagement with the flat transverse walls on the casing to support said strip in spaced substantially parallel relation to said wall portion for longitudinal reciprocation of said strip with flexing of said legs, and said flat transverse walls substantially eliminating movement of said strip in a direction transverse to said longitudinal reciprocation.

4. A shaver as claimed in claim 3, wherein said wall portion is formed with spaced outwardly extending closure walls extending between the cutter supports and forming a compartment between said cutter supports housing said cutter drive member, said closure walls terminating in substantially coplanar relation with the outer face of the strip portion of said cutter drive member for retaining said cutter drive member in operative position on said casing.

5. A shaver as claimed in claim 4, wherein said closure walls have the outer edges terminating adjacent the outer edges of said cutting means, and a flexible seal strip mounted on the outer side of said strip portion of the cutter drive member has side margins engaged between the outer edges of said closure walls and the outer edges of said cutting means and has the ends engaged with said cutter supports for sealing said compartment against the passage of hair clippings from said cutting means into said compartment while the intermediate portions of said seal strip are supported on the outer surface of said strip portion.

6. A cutter drive member for shaver cutting means comprising a rectangular frame formed of longitudinal and transverse bars joined to one another, flexible inextensible leg members of a fixed length attached at one end to the transverse bars at opposite ends of said frame and extending laterally from said frame in the same direction in substantially parallel relation, said legs being of substantially equal length and having straight extremities parallel to said frame for supporting said frame for reciprocating movement relative to the free ends of said legs, and a cutter drive arm attached to the central portion of said frame at one end to one of said transverse bars and extending away from said frame in a direction opposite to said legs with the free end of said arm having connection with said cutting means for operating said cutting means in vibration of said frame member.

7. A cutter drive member for shaver cutting means comprising a rectangular frame formed of a plurality of spaced parallel longitudinal and transverse bars joined together at their ends, a rectangular strip portion covering said frame and attached to one side of said bars, thin flexible sheet material strip forming legs of a fixed length having one end of each attached to the end transverse bars of said frame and extending in spaced substantially parallel relation laterally from said frame, said legs being formed on the free ends with straight edges to engage and support said drive member in spaced relation to a support for reciprocation of said frame with flexing of said legs, and a cutter operating arm having one end mounted on said frame and the other end extending outwardly therefrom in a direction opposite to said legs for engaging and reciprocating portions of said cutting means in the reciprocation of said frame on said legs.

8. An electric shaver comprising a shaver casing having a wall formed with portions for receiving and detachably mounting cutter means, said wall having spaced substantially flat transverse wall portions, a cutter drive member formed of a flat horizontal rectangular plate portion having flexible legs on opposite ends of the plate portion formed of flat strips and each of said legs extending downwardly in the same direction with the outer side edges terminating in substantially coincident relation with the sides of said plate portion and having the extremities of said legs formed with straight edges parallel to said plate portion for engagement with said wall portions and support of said plate portion for reciprocation in a plane substantially parallel to said wall portion, cutter actuating means having an extending member on said plate portion extending in a direction opposite to said legs to engage and operate said cutter means in movement thereof, and motor drive means in said casing having a movable drive member engaging said cutter drive member for reciprocating said plate portion on said legs and operating said cutter means through said extending member.

References Cited in the file of this patent

UNITED STATES PATENTS

| | | |
|---|---|---|
| 2,530,759 | Collins et al. | Nov. 21, 1950 |
| 2,601,720 | Carissimi | July 1, 1952 |
| 2,719,356 | Ritter | Oct. 4, 1955 |
| 2,802,261 | Heyek | Aug. 13, 1957 |
| 2,822,610 | Kleinman | Feb. 11, 1958 |
| 2,841,867 | Padgett | July 8, 1958 |
| 2,917,824 | Brauss | Dec. 22, 1959 |

FOREIGN PATENTS

| | | |
|---|---|---|
| 131,003 | Australia | Jan. 17, 1949 |
| 628,599 | Great Britain | Sept. 1, 1949 |
| 759,485 | Great Britain | Oct. 17, 1956 |
| 1,174,958 | France | Nov. 10, 1958 |